July 25, 1950 T. E. GOODWIN 2,516,201
TRIGGER AMPLIFIER
Filed May 16, 1947
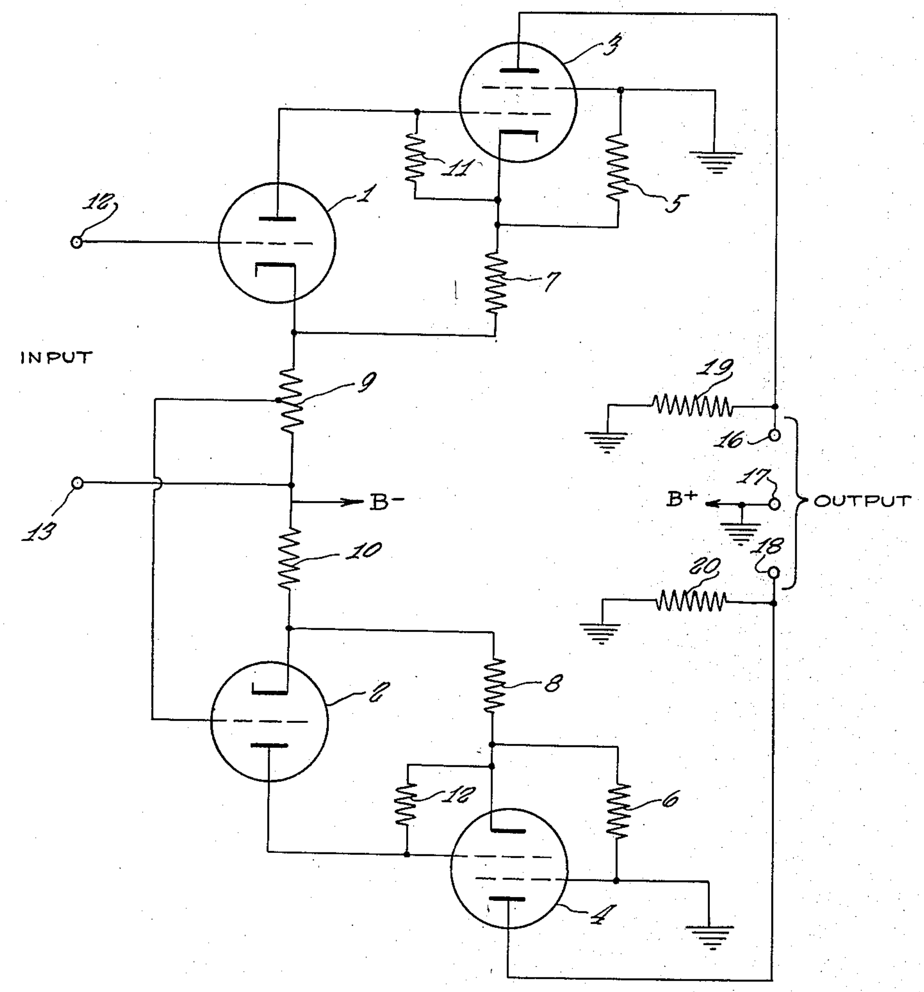
INVENTOR.
THOMAS E. GOODWIN
BY
Saulsbury, Russell & Squire
ATTORNEYS Patented July 25, 1950

2,516,201

UNITED STATES PATENT OFFICE 2,516,201

TRIGGER AMPLIFIER

Thomas E. Goodwin, Hempstead, N. Y., assignor to Erco Radio Laboratories, Inc., Garden City, N. Y., a corporation of New York Application May 16, 1947, Serial No. 748,608

16 Claims. (Cl. 250—27)

This invention relates to amplifiers for electrical impulses and more particularly to amplifiers which inherently produce an output of relatively square wave shape.

An object of the invention is to provide an amplifier adapted for use with input signals which may deviate from a square wave characteristic because of distortions which may have occurred during transmission or for other reasons and which will produce a signal at its output with a relatively square wave shape, notwithstanding the deviation of the input signal from a square wave shape.

A further object of the invention is to provide an amplifier utilizing tubes of the vacuum type each providing a continuous range of plate current control and which at the amplifier output exhibits trigger characteristics such as those which would be obtained by the use of gas filled tubes which can be only conductive or non-conductive. In this respect, the present invention offers the advantages which arise from the fact that the output current is either present or substantially cut off, but without the limitations on signaling speed which are inherent with the use of gas filled tubes and which limitations result from the time required for de-ionization of the gas within such tubes.

From another aspect, the invention contemplates the combination of two such amplifiers, symmetrically arranged to derive either a polar output or two separate outputs opposite in phase.

In accordance with a feature of the invention, an input consisting of unidirectional impulses may be translated into an amplified output of the full square wave type. Furthermore, this output will not be influenced by minor variations in the amplitude of the input signal.

The invention is particularly useful in connection with carrier current telegraphy and especially well suited for the amplification of rectified carrier current signals. When operating in this manner, it will provide an output either in the presence or in the absence of an incoming signal, as desired, or it may be used to derive a polarized output in which the polarity of current flow is determined by the presence of an incoming signal.

From another aspect, the invention permits the use of a power supply for the anodes whose positive terminal is grounded, thus permitting direct connection of the output circuits to the anodes of the output tubes without encountering high potentials with respect to ground. Ordinarily, telegraphic terminal apparatus, land lines, and other equipment which may be connected to the amplifier output will not be designed to withstand high potentials with respect to ground, and this feature of the invention avoids the necessity for providing instrumentalities of special design for use with or for connection to the amplifier output.

Other and further objects will become apparent upon reading the following specification together with the accompanying drawing forming a part hereof.

Referring to the drawing, the single figure shows a schematic circuit diagram of an embodiment of the invention.

The invention, among other uses, finds application in the field of frequency shift telegraphy, as illustrated in the pending application of Earle E. Eldredge, Serial No. 729,854, filed February 20, 1947.

Triode 1 and tetrode 3 are connected in cascade arrangement. Current flows from the positive terminal of the anode supply designated B+, which may be connected to ground as indicated, through the series circuit comprising impedances or resistors 5, 7 and 9. In the absence of an input signal of sufficient magnitude to cause operative response of the amplifier, the potential drop across resistor or impedance 9 will be such as to maintain the input triode 1 in a condition of substantial cutoff such that its anode draws no appreciable current.

It is assumed that the input circuit which is to be connected to terminals 12 and 13 provides sufficient direct current continuity so that the grid of triode 1 will normally be maintained, in the absence of a signal, at substantially the same potential as terminal 13, and it is further assumed that the input applied to terminal 12 is such that a signal to which the amplifier is to respond will be positive with respect to terminal 13. Thus, under the assumed conditions, a signal will be represented by a potential which will cause the grid of triode 1 to become more positive, and in the absence of a signal, this grid will assume substantially the same potential as terminal 13. There are numerous methods, well known in the art, of arranging the circuits external to the amplifier so that these assumed requirements may be complied with. In the event that it should be difficult or inconvenient to modify the external circuits, certain changes may be made with respect to the amplifier itself, such as changes in the grounding of the anode supply or other modifications of a generally similar nature which will be apparent to those skilled in the art.

As previously described, in the absence of a signal, triode 1 is cut off and draws no appreciable anode current, as a consequence, there will be little or no current flow through resistor 11 and the control grid of tetrode 3 will be at substantially the same potential as its cathode. As a result, the anode of tetrode 3 will draw a relatively heavy current through the external load which will provide continuity to ground if connected between terminals 16 and 17. If the external load is connected between terminals 16 and 18 for polar operation, as described below, then resistors 19 and 20 must be used to provide a return path to the positive terminal of the anode supply. In such a case these resistors will have values determined by the characteristics of the amplifier circuits and of the load, and may be selected to provide the maximum power output into the connected load.

When a signal is applied to the input terminals 12 and 13, the grid of triode 1 will become more positive and this tube will begin to draw current. This current will flow through resistor 11 and the accompanying potential drop will cause the control grid of tetrode 3 to become more negative. As the control grid of tetrode 3 becomes more negative, its space current and accordingly the current through resistor 9 are both decreased. The decrease in current through resistor 9 effectively increases the positive potential applied to the grid of triode 1, independently of the positive potential of the signal and cumulatively therewith. As a result, triode 1 will become conducting and tetrode 3 will become cut off, or nearly so. This change will occur abruptly even though the input voltage may be changing slowly.

In practice, the circuit constants are preferably so selected that, with the minimum signal to which the amplifier is to respond applied to input terminals 12 and 13, an abrupt change will be produced from cut off in triode 1 to cut off in tetrode 3, and the reversal of conditions will not occur until the signal has dropped to a value of approximately one half this minimum. This ratio may be varied, depending upon the particular operating conditions, but in any event, there will be a range of input potentials up to the minimum intended signal which will not affect the amplifier. After the amplifier has responded to the signal, there will be a downward range extending to some predetermined fraction of the minimum signal threshold, through which range the response will be retained. These two critical values of input voltage are sufficiently separated to render the amplifier stable in operation.

When a polar or full square wave output is desired, triode 2 and tetrode 4 are provided and are connected for operation in a manner similar to triode 1 and tetrode 5 respectively. Resistors 6, 8 and 10 are connected in a manner similar to resistors 5, 7 and 9 respectively. Resistor 12 produces cut off in tetrode 4 in response to current flow in triode 2 in the same manner as described above for resistor 11 operating in conjunction with tetrode 3 and triode 1.

The grid of triode 2, however, is connected to a point in the cathode return circuit of triode 1, which may be a tap on resistor 9 so selected that in the absence of a signal, triode 2 will be in a conductive condition and correspondingly, tetrode 4 will be cut off. When a signal is received which produces operative response of triode 1 and tetrode 3, the current in this circuit will decrease and the grid of triode 2 will change potential in a negative direction sufficiently to produce cut off in triode 2 and conduction in tetrode 4.

In operation, considering only the upper half of the complete amplifier as shown in the diagram, an input comprising a series of positive impulses of varying spacing and duration will produce an output of the same phase and polarity, but with newly formed and accentuated rectangular wave shapes. The lower half will produce a similar output, but opposite in phase. The two outputs combined will produce a polar output substantially symmetrical with respect to the zero voltage axis. An output in phase with the input may be obtained at terminals 16 and 17. A reversed phase output appears at terminals 18 and 17, and a full wave or polar output may be derived from terminals 16 and 18. If the polarized apparatus connected to terminals 16 and 18 comprises a center tap, resistors 19 and 20 may be omitted and the center tap connected to terminal 17 or to ground, depending upon circuit conditions. Otherwise, resistors 19 and 20 must be provided as described above. Each application of an input signal above the threshold value will produce an abrupt change from conduction in tetrode 4 to conduction in tetrode 3. A drop in voltage of the applied signal to less than a predetermined fraction of the threshold or critical potential will result in another abrupt change to the original conditions, that is from conduction in tetrode 3 to conduction in tetrode 4.

I have described what I believe to be the best embodiments of my invention. I do not wish, however, to be limited to the embodiments shown but to the invention as described in the appended claims.

I claim:

1. In an amplifier, a pair of input stages and a pair of output stages, each associated with one of the input stages, each stage comprising an anode, a control grid and cathode means, a pair of impedance means each adapted to be energized conjointly by a source of positive potential and by the anode-cathode current of one of the output stages and disposed to maintain the cathode means of its associated input stage at a relatively positive potential with respect to the control grid thereof, a pair of further impedance means each interconnecting the cathode means of each of the output stages and the anode of the input stage associated therewith and disposed to render the control grid of the output stage relatively more negative with respect to its associated cathode in response to current flow through the further impedance means, and circuit means arranged to apply a relatively positive potential derived in one of the first-named impedance means to the control grid of the input stage associated with the other first-named impedance means of the pair and sufficient in magnitude to overcome the relatively negative potential at which the last-named control grid would otherwise be maintained.

2. An amplifier as in claim 1 in which the several impedance means comprise only resistors.

3. In an amplifier, a pair of input stages and a pair of output stages, each associated with one of the input stages, each stage comprising an anode, a control grid, and cathode means, a pair of impedance means each adapted to be energized by the anode-cathode current of one of the output stages and disposed to maintain the cathode means of its associated input stage at a relatively positive potential with respect to the control grid thereof, a pair of further impedance means each interconnecting the cathode means of each of the output stages and the anode of the input stage associated therewith and disposed to render the control grid of the output stage relatively more negative with respect to its associated cathode in response to current flow through the further impedance means, and circuit means arranged to apply a relatively positive potential derived in one of the first-named impedance means to the control grid of the input stage associated with the other first-named impedance means of the pair and sufficient in magnitude to overcome the relatively negative potential at which the last-named control grid would otherwise be maintained.

4. An amplifier as in claim 3 in which the several impedance means comprise only resistors.

5. In an amplifier system having a full square wave output, a pair of similar trigger amplifiers, each comprising an input vacuum tube having a control electrode, a circuit in each trigger amplifier comprising an impedance across which a change in potential accompanies triggering thereof, an input circuit for the amplifier system comprising the control electrode of the input vacuum tube of a first one of the trigger amplifiers, and a further circuit extending between the control electrode of the input vacuum tube of the second one of the trigger amplifiers of the pair and the impedance circuit of the first trigger amplifier to a point therein at which a potential is derived which causes triggering of the second trigger amplifier to occur in response to triggering of the first trigger amplifier and opposite in phase thereto.

6. An amplifier system as in claim 5 in which the control electrode is a grid.

7. An amplifier system as in claim 5 in which the impedance is a resistor.

8. An amplifier system as in claim 5 in which the control electrode is a grid and the impedance is a resistor.

9. In an amplifier system having a full square wave output, a pair of similar trigger amplifiers, each comprising an input vacuum tube having a control electrode, an output circuit for each trigger amplifier, a circuit in each trigger amplifier comprising an impedance across which a change in potential accompanies triggering thereof, an input circuit for the amplifier system comprising the control electrode of the input vacuum tube of a first one of the trigger amplifiers, a further circuit extending between the control electrode of the input vacuum tube of the second one of the trigger amplifiers of the pair and the impedance circuit of the first trigger amplifier to a point therein at which a potential is derived which causes triggering of the second trigger amplifier to occur in response to triggering of the first trigger amplifier and opposite in phase thereto, and an output circuit for the entire amplifier comprising the combined output circuits of the pair of trigger amplifiers.

10. An amplifier system as in claim 9 in which the control electrode is a grid.

11. An amplifier system as in claim 9 in which the impedance is a resistor.

12. An amplifier system as in claim 9 in which the control electrode is a grid and the impedance is a resistor.

13. In an amplifier system having a square wave output, a first trigger amplifier and a second trigger amplifier, each comprising an input vacuum tube having a control electrode, a circuit in the first trigger amplifier comprising an impedance from which a potential may be derived which shifts between two substantially fixed values in accordance with triggering thereof, an input circuit for the amplifier system extending to the control electrode of the first trigger amplifier, and a further circuit extending between the control electrode of the second trigger amplifier and the impedance circuit of the first trigger amplifier to a point therein at which a potential is derived which causes triggering of the second trigger amplifier to occur in response to triggering of the first trigger amplifier and opposite in phase thereto, and circuit means for combining the outputs of the two trigger amplifiers to derive the square wave output.

14. An amplifier system as in claim 13 in which the two trigger amplifiers are substantially identical.

15. An amplifier system as in claim 13 further comprising an output circuit for each trigger amplifier and an output circuit for the entire amplifier which combines the output circuits of the two trigger amplifiers.

16. An amplifier system as in claim 13 in which the two trigger amplifiers are substantially identical and further comprising an output circuit for each trigger amplifier and an output circuit for the entire amplifier which symmetrically combines the output circuits of the two trigger amplifiers to produce a full square wave output.

THOMAS E. GOODWIN.

REFERENCES CITED

The following references are of record in the file of this patent:

UNITED STATES PATENTS

| Number | Name | Date |
|---|---|---|
| 2,071,759 | Minorsky | Feb. 23, 1937 |
| 2,109,021 | Clark | Feb. 22, 1938 |
| 2,270,449 | Kahn | Jan. 20, 1942 |
| 2,289,301 | Barber | July 7, 1942 |

FOREIGN PATENTS

| Number | Country | Date |
|---|---|---|
| 373,309 | Great Britain | May 26, 1932 |
| 841,844 | France | May 31, 1939 |